Patented May 31, 1949

2,471,638

UNITED STATES PATENT OFFICE 2,471,638

RUST PREVENTIVE COMPOSITIONS

Paul R. McCarthy, Allison Park, Pa., assignor to Gulf Research & Development Company, Pittsburgh, Pa., a corporation of Delaware No Drawing. Application July 14, 1945, Serial No. 605,178

6 Claims. (Cl. 106—14)

The present invention relates to rust preventive compositions, and it is particularly concerned with an improved liquid slushing oil which is adapted to inhibit the formation of rust on metal surfaces in contact with moisture.

Slushing-type coatings are used extensively for protection against rust of ferrous metal surfaces, such as steel sheets, machinery, tools, engines, tanks, turbines, guns and the like. Protection of ferrous metal surfaces against rust formation is important during the storage and shipment of such materials especially in humid atmospheres, such as those encountered in the tropics and on the seaboard. Many compositions of the liquid slushing-oil type have heretofore been disclosed, but they have been relatively inefficient because they afford protection against corrosion for a very limited period of time.

It is an object achieved by this invention to provide an efficient and economical liquid rust preventive composition which is adapted to be applied to metal surfaces to form a water-impervious film thereon. It is a further object achieved by this invention to provide an improved liquid rust preventive composition which adheres tenaciously to metal surfaces and which is highly effective in preventing the corrosion and/or rusting thereof for prolonged periods of time.

I have found that an improved liquid rust preventive composition which is adapted to form a water-impervious film on metal surfaces and which combines prolonged resistance to corrosion with ease of application to the metal surfaces to be protected can be produced by incorporating in a mineral oil a bodying agent, an oil-soluble wetting agent, and a film-forming agent.

The mineral oil employed in the preparation of my improved liquid rust preventive composition may be either a naphthenic or a paraffinic oil preferably ranging in viscosity from about 100 seconds to about 500 seconds at 100° F. Oils having viscosities above about 500 seconds at 100° F. may be used, but they are less easily applied to metal surfaces at room temperature because they are more viscous. Oils having viscosities below about 100 seconds at 100° F. may be used in certain localities for a specific purpose, but ordinarily oils of this type are too volatile for a general purpose rust proofing oil, thus affording protection for shorter periods of time. Depending upon the desired characteristics of the finished rust preventive composition, the mineral oil may be employed in an amount as small as 10 per cent or as large as 95 per cent, by weight, of the total composition. However, compositions containing oil in amounts of 50 per cent or less are ordinarily referred to as semi-solid or solid compositions. Compositions containing oil in an amount between about 50 per cent and about 70 per cent are usually syrupy in nature. These amounts may vary, of course, depending upon the viscosity of the oil. The easily applied compositions of the present invention advantageously embody mineral oil in an amount between about 83 per cent and 93 per cent by weight of the total composition.

The bodying agent of the improved liquid rust preventive composition of this invention comprises a micro-crystalline wax having a melting point of about 150° to 160° F. It is desirable to employ a micro-crystalline wax in my improved liquid rust preventive composition in order to obtain a coating of uniform characteristics. If a macro-crystalline wax, such as paraffin wax, is utilized, the rust preventive coating has a more grainy surface than if a micro-crystalline wax is used, and there is a greater opportunity for rusting to occur. Typical examples of micro-crystalline waxes are the petrolatum waxes. Petrolatum waxes have proved particularly advantageous for the purpose of this invention. Depending upon the desired characteristics of the final product, the wax may be employed in an amount between about 5 per cent and about 75 per cent, by weight, based on the weight of the total composition. The improved composition of the present invention advantageously contains between about 5 per cent and about 15 per cent, by weight, of petrolatum wax. When a more viscous base oil is employed, the amount of petrolatum wax employed is generally less than when an oil is used which is lighter in gravity.

In order to obtain a rapid and effective wetting of the metal surface to which my improved liquid rust preventive composition is applied, and to readily disperse the other constituents of my rust preventive composition, an oil-soluble wetting agent is used as one of the constituents. Any suitable oil-soluble wetting agent may be used, and satisfactory results have been obtained with a variety of wetting agents, such as the sodium salt of the oil-soluble petroleum sulfonic acids, o-dimethylamino-ethyl-p-tertiary butylphenol, and 2 - oleyl - 4 - methyl - 4 - hydroxymethyl - 2 - oxazoline. The oil-soluble wetting agents may be employed in amounts as high as 20 per cent based on the weight of the total composition, but for reasons of economy it is desirable to use an amount of about 1 to 2 per cent by weight.

The film-forming agent in my improved liquid rust preventive composition is advantageously a drying oil such as tung oil, linseed oil and blown oils, including blown soya oil, blown rapeseed oil, blown cotton seed oil, blown linseed oil, and blown tung oil. While it has been noted that drying oils of a high viscosity, that is, viscosities of 1900 to 2000 seconds at 210° F., are most desirable in forming a tenacious film, the use of oils of lower viscosity, 600 to 700 seconds at 210° F., is also contemplated. The film-forming agent may be employed in amounts as high as 20 per cent based on the weight of the total composition, but for economic reasons it is desirable to use an amount of about 1 to 2 per cent, by weight. The film-forming agent and the wetting agent are advantageously incorporated in the mineral oil in equivalent proportions.

The advantages to be obtained by the use of the improved liquid slushing oil compositions of the present invention as compared with the use of slushing oil compositions containing only one or two of the three addition agents are illustrated in the following specific examples.

In these tests base oils were employed having viscosities within the range of about 100 to 500 seconds at 100° F. The oils had the following properties:

|  | Oil A | Oil B | Oil C |
| --- | --- | --- | --- |
| Gravity, ° A. P. I | 27.0 | 24.0 | 21.4 |
| Viscosity, S. U. S. at— |  |  |  |
| 100° F | 102.2 | 105 | 510 |
| 210° F | 38.8 | 38.4 | 53.9 |
| Flash Point (OC), ° F | 355 | 320 | 385 |
| Fire Point (OC), ° F | 410 | 365 | 440 |
| Pour Point, ° F | +10 | −50 | −10 |
| Color, N. P. A | 1.75 | 4.0 | 3.0 |

As a bodying agent, a petroleum wax having the following properties was used:

Gravity, °A. P. I _____ 30.4
Viscosity, S. U. S., at 210° F _____ 99.8
Melting point ASTM (D127-30), °F _____ 153.4
ASTM penetration, 150 grams and 5 sec. at 77° F _____ 83

As examples of the film-forming agents, blown rapeseed oil, and blown soya oil were used. The blown rapeseed oil and blown soya oil had viscosities of 1900 to 2000 seconds at 210° F.

In preparing the rust preventive compositions, the ingredients were stirred in a suitable vessel at about 200° F. for about ten minutes. The resulting composition was then cooled to room temperature. Polished SAE 1020 steel cylindrical rods were then immersed in the rust preventive composition, after which they were withdrawn and allowed to drain for four hours.

The oil-coated steel rods were then placed in a humidity cabinet which was maintained at a relative humidity of 100 per cent at a temperature of 100° F. Each specimen was observed daily for the first appearance of corrosion thereon, and the results obtained with the various compositions employed are shown in the following table. While I have applied the slushing oils to the steel rods by a dipping procedure, any desired procedure, such as spraying or brushing, may be used.

| Ingredients | Compositions Tested | | | | | | | | |
| --- | --- | --- | --- | --- | --- | --- | --- | --- | --- |
|  | A | B | C | D | E | F | G | H | I |
| Mineral Oil Base, percent by Weight: |  |  |  |  |  |  |  |  |  |
| Oil A |  |  |  |  |  |  |  | 86 | 84 |
| Oil B | 88 | 87 | 87 | 86 | 86 | 84 |  |  |  |
| Oil C |  |  |  |  |  |  | 92 |  |  |
| Bodying Agent, percent by Weight: Petrolatum Wax | 12 | 12 | 12 | 12 | 12 | 11 | 6 | 12 | 12 |
| Oil-Soluble Wetting Agent, percent by Weight: |  |  |  |  |  |  |  |  |  |
| 2-oleyl-4-methyl-4-hydroxymethyl-2-oxazoline |  |  |  |  |  |  |  | 1 |  |
| The sodium salt of the oil-soluble petroleum sulfonic acids |  | 1 |  | 1 | 2 | 5 | 1 |  | 2 |
| Film-Forming Agent, percent by Weight: |  |  |  |  |  |  |  |  |  |
| Blown Soya Oil |  |  | 1 | 1 |  |  | 1 |  |  |
| Blown Rapeseed Oil |  |  |  |  |  |  |  | 1 | 2 |
| Period of Protection against corrosion in humidity cabinet, hrs | 16 | 120 | 252 | 525 | 236 | 312 | 500 | 400 | 360 |

My improved rust preventive composition is considerably more effective in preventing corrosion of metal surfaces to which it is applied than any other oil-base rust preventive composition consisting solely of a light oil containing petrolatum wax, a light oil containng petrolatum wax and a wetting agent, or a light oil containing petrolatum wax and a film-forming agent.

As can be noted from the data in the above table, composition A, consisting of 88 per cent of oil B and 12 per cent of petrolatum wax, gave protection against corrosion for only 16 hours. When 1 per cent of the oil B of composition A was replaced with 1 per cent of an oil-soluble wetting agent, the sodium salt of the oil-soluble petroleum sulfonic acids, as shown by composition B, the period of protection increased to 120 hours. When 1 per cent of the oil B of composition A was replaced by 1 per cent of a film-forming agent, blown rapeseed oil, as shown by composition C, the period of protection increased to 252 hours. When 2 per cent of the oil B of composition A was replaced with 1 per cent each of the sodium salt of the oil-soluble petroleum sulfonic acids and blown rapeseed oil, the period of protection increased to an unpredictable 525 hours. Compositions E and F indicate that when the sodium salt of the oil-soluble petroleum sulfonic acids is used as the sole addition agent in amounts of 2 and 5 per cent, respectively, the protection may be increased over the protection afforded when only 1 per cent of the sodium salt of the oil-soluble petroleum sulfonic acids is used, as shown by composition B. The improvement, however, is not comparable to that obtained when only 1 per cent each of the wetting agent and film-forming agent is used. Furthermore, if only the wetting agent were relied upon to give the prolonged protection offered by the compositions of the present invention, the amount of wetting agent required would increase considerably the cost of the composition. In composition G a more viscous oil was used, and only one-half as much petrolatum wax as was employed in composition D. The other additives remained the same as composition D. The protection afforded by this oil was for 500 hours. In composition H 400 hours of protection were obtained with oil A in conjunction with 2-oleyl-4-methyl-4-hydroxymethyl-2-oxazoline as the oil-soluble wetting agent and blown soya oil as the film-forming agent. Composition I, consisting of 84 per cent of oil A, 12 per cent of petrolatum wax, and 2 per cent each of the sodium salt of the oil-soluble petroleum sulfonic acids and blown soya oil, gave protection for only 360 hours. Composition I, however, is a considerable improvement over compositions A, B and C.

While the invention has been described herein with particular reference to certain specific embodiments thereof by way of illustration, it is to be understood that the invention is not limited to such embodiments except as hereinafter defined in the appended claims.

What I claim is:

1. An improved liquid rust preventive composition adapted to form a water-impervious film on metal surfaces consisting essentially of a mineral oil having a viscosity wthin the range of from about 100 seconds to about 500 seconds at 100° F., and containing 5 to 15 per cent, by weight, of petrolatum wax, 1 to 2 per cent, by weight, of an oil-soluble wetting agent, and 1 to 2 per cent, by weight, of blown soya oil having a viscosity of about 1900 seconds to about 2000 seconds at 210° F.

2. An improved liquid rust preventive composition adapted to form a water-impervious film on metal surfaces consisting of 93 to 81 per cent by weight of mineral oil having a viscosity within the range of from about 100 seconds to about 500 seconds at 100° F., 5 to 15 per cent by weight of petrolatum wax, 1 to 2 per cent by weight of the sodium salt of the oil-soluble petroleum sulfonic acids, and 1 to 2 per cent by weight of a drying oil having a viscosity of from about 1900 seconds to about 2000 seconds at 210° F.

3. An improved liquid rust preventive composition adapted to form a water-impervious film on metal surfaces consisting of 93 to 81 per cent by weight of mineral oil having a viscosity within the range of from about 100 seconds to about 500 seconds at 100° F., 5 to 15 per cent by weight of petrolatum wax, 1 to 2 per cent by weight of the sodium salt of the oil-soluble petroleum sulfonic acids, and 1 to 2 per cent by weight of blown rapeseed oil having a viscosity of from about 1900 seconds to about 2000 seconds at 210° F.

4. An improved liquid rust preventive composition adapted to form a water-impervious film on metal surfaces consisting of 93 to 81 per cent by weight of mineral oil having a viscosity within the range of from about 100 seconds to about 500 seconds at 100° F., 5 to 15 per cent by weight of petrolatum wax, 1 to 2 per cent by weight of o-dimethylamino-ethyl-p-tertiary butylphenol, and 1 to 2 per cent by weight of blown rapeseed oil having a viscosity of from about 1900 seconds to about 2000 seconds at 210° F.

5. An improved liquid rust preventive composition adapted to form a water-impervious film on metal surfaces consisting of 93 to 81 per cent by weight of mineral oil having a viscosity within the range of from about 100 seconds to about 500 seconds at 100° F., 5 to 15 per cent by weight of petrolatum wax, 1 to 2 per cent by weight of 2-oleyl-4-methyl -4- hydroxymethyl - 2 - oxazoline, and 1 to 2 per cent by weght of blown rapeseed oil having a viscosity of from about 1900 seconds to about 2000 seconds at 210° F.

6. An improved liquid rust-preventive composition adapted to form a water-impervious film on metal surfaces consisting essentially of a mineral oil having a viscosity within the range of from about 100 seconds to about 500 seconds at 100° F., and containing 5 to 15 per cent, by weight, of petrolatum wax, 1 to 2 per cent, by weight, of an oil-soluble wetting agent, and 1 to 2 per cent, by weight, of a drying oil having a viscosity of from about 1900 seconds to about 2000 seconds at 210° F.

PAUL R. McCARTHY.

REFERENCES CITED

The following references are of record in the file of this patent:

UNITED STATES PATENTS

| Number | Name | Date |
| --- | --- | --- |
| 1,674,694 | Millring | June 26, 1928 |
| 2,119,553 | MacLaren | June 7, 1938 |
| 2,182,992 | Lebo | Dec. 12, 1939 |
| 2,235,944 | Penniman | Mar. 25, 1941 |
| 2,248,961 | Comstock | July 15, 1941 |
| 2,348,715 | Adams et al. | May 16, 1944 |

FOREIGN PATENTS

| Number | Country | Date |
| --- | --- | --- |
| 469,889 | Great Britain | Aug. 4, 1937 |

OTHER REFERENCES

U. S. Dispensatory, 23rd edition (1943), pages 286 and 287.